United States Patent [19]

McCabe et al.

[11] 4,428,200
[45] Jan. 31, 1984

[54] GEOTHERMAL PLANT FLUID REINJECTION SYSTEM

[75] Inventors: Barkman C. McCabe, Los Angeles; Edward Zajac, Hollywood; John L. Featherstone, El Centro, all of Calif.

[73] Assignee: Magma Power Company, Los Angeles, Calif.

[21] Appl. No.: 177,633

[22] Filed: Aug. 13, 1980

[51] Int. Cl.³ .............................................. F03G 7/04
[52] U.S. Cl. .................................... 60/641.5; 165/45; 210/170
[58] Field of Search ................. 60/641.2, 641.3, 641.4, 60/641.5; 165/45; 210/170, 714, 715, 747

[56] References Cited

U.S. PATENT DOCUMENTS

| | | | |
|---|---|---|---|
| 3,951,794 | 4/1976 | Swearingen | 60/641.2 X |
| 4,127,989 | 12/1978 | Mickelson | 60/641.2 |
| 4,304,666 | 12/1981 | Van Note | 60/641.2 X |

FOREIGN PATENT DOCUMENTS 54-107151 8/1979 Japan ................................ 60/641.2

Primary Examiner—Allen M. Ostrager
Assistant Examiner—Stephen F. Husar
Attorney, Agent, or Firm—Albert L. Gabriel

[57] ABSTRACT

A system for extending the operational life of the reinjection system of a geothermal power plant energized by high temperature, high silica content geothermal brine from a source such as the Salton Sea geothermal field or the Brawley geothermal field. The stream of geothermal brine which flows through the plant is passed slowly through a zone of particulate material having a large cumulative surface area in contact with the brine to seed the precipitation of dissolved silica from the brine onto the particles so as to reduce the amount of dissolved silica available for precipitation in the reinjection system. The zone of particulate material may be established as a floating silica sludge blanket in a reactor clarifier which also has a reaction zone in which silica precipitation is initiated. The vessel such as a reactor clarifier in which the zone of particulate material is established is maintained devoid of atmospheric oxygen to minimize other chemical reactions in said zone that would be injurious to the reinjection system.

59 Claims, 4 Drawing Figures

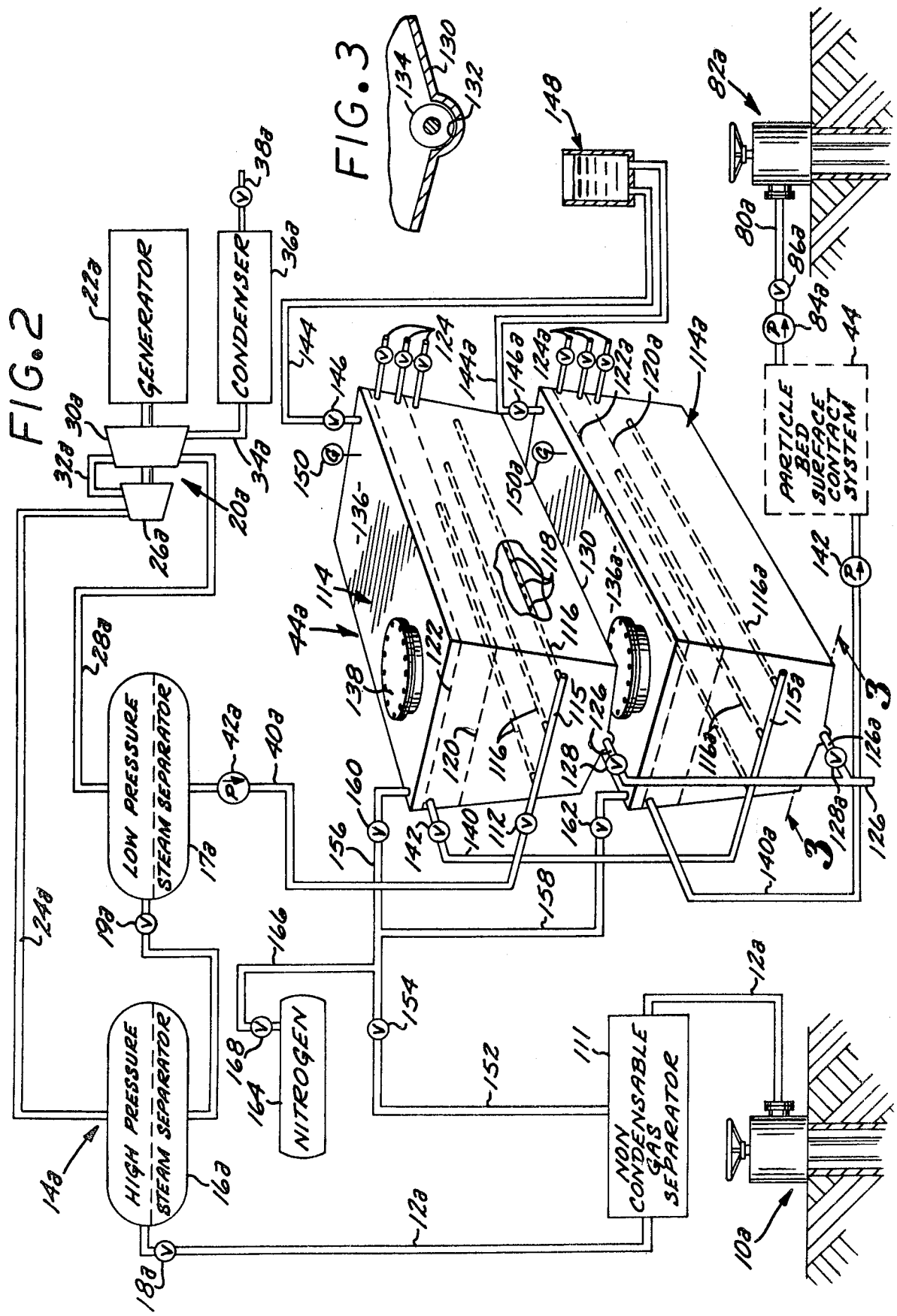

GEOTHERMAL PLANT FLUID REINJECTION SYSTEM

BACKGROUND OF THE INVENTION

1. Field of the Invention

The invention is in the field of electrical power production from high temperature geothermal brines which have a high dissolved silica content.

2. Description of the Prior Art

Some very high temperature geothermal brine resources are known which contain large amounts of geothermal energy, but which have heretofore not been usable for the commercial production of electrical power because of a high dissolved silica content. These resources include the Salton Sea and Brawley geothermal fields in the Imperial Valley in California, where underground geothermal brine source temperatures range from about 500° F. to about 620° F. and the dissolved silica content is at substantially the saturated level for these brine source temperatures, ranging from about 500 to about 600 parts per million by weight. This high silica content appears to result from the nature of the porous rock formations in the high temperature brine sources in geothermal fields of this type.

Extensive flow testing of high temperature, high silica Salton Sea field brines has been carried out in a simulated geothermal power plane at Niland, Imperial County, California, where the high temperature geothermal brine is flowed up through a production well under the power of its own flashing steam, then flowed through a heat extraction facility simulating a geothermal electrical power generating plant, and then pumped back into an underground formation through a reinjection well spaced a considerable distance from the production well. This testing operation at Niland, although making use of the best state-of-the-art technology, revealed that the high, substantially saturated dissolved silica content in this type of high temperature geothermal brine resource causes such a severe plugging problem in reinjection equipment, and particularly in the reinjection well, that it would not be practical to attempt to produce electrical power on a commercial basis from this type of geothermal resource using prior art technology.

The basis for this problem is that the saturation amount of silica lowers as the temperature of the geothermal brine drops when the brine flows up to the production well, passes through the heat extraction equipment of the plant, and is then flowed through piping to a remote reinjection well and down into the reinjection well. The silica saturation curve has a relatively gentle descent from the underground source temperature of approximately 500° F. to 620° F. down through relatively high temperature heat extraction equipment of the plant such as a first stage flash vessel in which the temperature of the brine may be reduced down to perhaps 320° F. to 375° F. after flashing. However, the silica saturation curve then drops off much more steeply below these temperatures, and particularly in reinjection equipment including the reinjection piping and reinjection well wherein the brine temperature will drop down to approximately the boiling point of the brine.

Because the silica saturation curve descends only gradually in the temperature range of the production well bore, and the silica precipitation reaction is a slow one, little or no silica scaling is likely to occur in the production well bore. This also holds true for production brine input conduits of the plant where the brine temperature is still high and residency time is brief. However, the increasingly steep silica saturation curve for the relatively large temperature drop in successive flash vessels or other heat extraction apparatus such as heat exchangers in a binary system, and the further temperature drops associated with reinjection piping and initial flow into a reinjection well, coupled with a considerable residency time of the brine in such heat extraction and reinjection equipment, will cause silica to precipitate out of the brine in progressively increasing quantities as the temperature of the brine is reduced in its flow path through the heat extraction and reinjection equipment. The amount of silica precipitation is greatest in the reinjection equipment, both because of the fact that the silica saturation level drops at the greatest rate as the temperature of the brine approaches reinjection temperatures, and also because the slow silica precipitation reaction has, by the time the brine reaches the reinjection equipment, already had a considerable amount of time to operate in the supersaturated condition upstream of the reinjection equipment.

Such silica precipitation occurs principally as scaling in the form of a hard, rock-like glaze on the inner walls of flash vessels or heat exchangers in the heat extraction apparatus, in various conduits including the usually quite long reinjection conduit from the main plant site to a reinjection well site, and most importantly in the reinjection well casing where the precipitated silica causes rapid plugging that will lead to loss of the well. While surface equipment of the plant such as steam separators and piping can either be cleaned out or replaced when the silica buildup becomes too great, silica precipitation that causes plugging within a reinjection well casing is, under the present state of the art, a much more serious problem in that there is no practical conventional way to clean out such a silica-plugged reinjection well, so that when such plugging reduces the reinjection flow volume below acceptable limits, it would then be necessary to drill and case a new reinjection well, at great expense.

Some attention was given to the matter of controlling mineral precipitation in connection with a geothermal electrical power plant in U.S. Pat. No. 3,757,516 issued to Barkman C. McCabe. That patent taught the principle of deep well pumping in a geothermal hot water production well and pressurization throughout the entire plant system on through reinjection primarily to avoid the loss of heat of vaporization from that portion of the fluid which would otherwise flash to steam in the production well, but also to prevent mineral precipitation at any point in the entire flow path. However, the said McCabe Pat. No. 3,757,516 was concerned only with geothermal plants that produced electrical power from geothermal resources having temperatures under about 400° F., where the principal scaling problem involved the precipitation of carbonates in the production well bore and heat exchangers.

The pressurization procedure taught in said McCabe U.S. Pat. No. 3,757,516 while effective to prevent some types of scaling such as from carbonates, would, however, not be effective to prevent dissolved silica from precipitating out in the reinjection piping and reinjection well of a geothermal power plant, as such silica precipitation depends only upon temperature reduction to put the dissolved silica in a supersaturated condition, and time for the slow silica precipitation reaction to occur. Nevertheless, the geothermal hot water or brine having the relatively low source temperatures to which that prior patent applied (below about 400° F.) did not carry the large quantities of silica (even if saturated with silica) that are found at substantially the saturation level in very hot brines running from about 500° F. to about 620° F. in geothermal energy resources like the Salton Sea and Brawley geothermal fields. It is these large quantities of silica in very hot brine which heretofore have presented insurmountable problems in attempts to utilize this huge thermal potential energy resource for the commercial generation of electrical power.

U.S. Pat. No. 4,043,129 issued to Barkman C. McCabe and Edward Zajac applied the deep well pumping concept of the earlier McCabe U.S. Pat. No. 3,757,516 to high temperature geothermal brines above about 500° F. The McCabe-Zajac U.S. Pat. No. 4,043,129 taught that the advantages of deep well pumping, including avoidance of the loss of heat of vaporization and reduction of mineral precipitation, could be realized in connection with very high temperature geothermal brines by mixing a high temperature geothermal brine which might have a relatively high mineral content derived from a relatively deep well with a lower temperature brine that might have a relatively low mineral content derived from a shallower or peripheral well, to produce a brine mixture of sufficiently lower temperature to the within the practical temperature and pressure ranges for pumping and which may also have a lowered mineral content. However, this still would not solve the serious silica scaling problem in the reinjection piping and reinjection well of a geothermal power plant where the high temperature brines had a dissolved silica content proximate saturation levels at source temperatures, the situation in the Salton Sea and Brawley geothermal fields.

Some more recent prior art work has involved the use of a reactor clarifier, a type of apparatus known in the sewage treatment art, in an attempt to reduce the silica content of high temperature, high silica geothermal brines so as to protect reinjection well equipment against silica plugging. A publication regarding such use of a reactor clarifier was made at the Second Invitational Well-Testing Symposium of Oct. 25-27, 1978 at the University of California, Berkeley, by Robert H. Van Note, John L. Featherstone and Bernard Pawlowski, entitled "A Cost-Effective Treatment System for the Stabilization of Spent Geothermal Brines". In the normal mode of operation of a reactor clarifier for the treatment of sewage it was left open for exposure of the sewage to atmospheric oxygen; there was no suggestion in said publication that anything other than such normal mode of operation be employed when a reactor clarifier was used for the treatment of geothermal brine. There was no concern in the prior art respecting exposure to atmospheric oxygen of geothermal brines from such sources as the Salton Sea and Brawley geothermal fields, because it was well recognized in the prior art that with the very high chloride salt contents of such geothermal brines (from about 200,000 to about 360,000 parts per million by weight of chloride salts after the brine had been flashed to atmospheric pressure) the brines had little or no capacity for the absorption of atmospheric oxygen.

However, geothermal brines from such sources as the Salton Sea and Brawley geothermal fields have a peculiar combination of chemical characteristics that applicants have found would cause very serious problems if the brines should be exposed to atmospheric oxygen, although there was no recognition of such in the prior art. These brines in their production source condition are in a very reduced oxygen state, and they contain a large amount of dissolved iron in its chemically reduced ferrous ($Fe^{2+}$) state. Despite the normal incapacity of brines having such high chloride salt content to absorb oxygen, the very reduced state thereof enables a chemical hydrolysis reaction to occur which involves atmospheric oxygen and ferrous iron. This results in a considerable amount of iron precipitating out which increases reinjection well plugging problems, and also results in a reduction of the pH of the brine which makes it more acidic and corrosive to reinjection equipment.

SUMMARY OF THE INVENTION

In view of these and other problems in the art, it is a general object of the present invention to make available for the first time for the production of electrical power on a commercial basis the large, high temperature resources such as the Salton Sea and Brawley geothermal fields in which a high dissolved silica content has heretofore made commercial electrical power production impractical.

Another object of the invention is, in a geothermal electrical power plant of the character described which utilizes high temperature, high silica content geothermal brine, to provide a novel reinjection system wherein a large proportion of the silica content of the brine is precipitated and removed from the thermally spent brine flow stream before the stream passes to the reinjection well so as to avoid plugging of the reinjection well.

A further object of the invention is, in a geothermal electrical power plant of the character described, to precipitate and remove from the thermally spent geothermal brine stream sufficient of the dissolved silica to reduce the silica content of the brine to proximate or slightly below saturation for reinjection temperatures.

According to the invention, in the reinjection system of a geothermal power plant which derives its heat energy from high temperature, high dissolved silica content geothermal brine, a zone of particulate material is established through which the thermally spent brine stream of the plant passes prior to reinjection, the particulate material in this zone presenting a very large overall surface area which is in contact with the brine. The flow rate of the brine stream through this particulate zone is regulated so that the brine has an extended residency time of contact with the particulate material, which enables the particulate material to seed the precipitation of silica and to cause continued precipitation of a large quantity of silica thereon, despite the slow nature of the silica precipitation reaction. By this means a sufficient proportion of the dissolved silica is removed from the brine prior to reinjection to prevent plugging of the reinjection well with precipitated and/or precipitating silica.

In one form of the invention the zone of particulate material comprises one or more stationary particle beds through which the geothermal brine stream flows. In another form of the invention the zone of particulate material comprises a floating silica sludge blanket established in one or more "Baker" settling tanks, the geothermal brine of the flow stream slowly upwelling through the blanket for particulate silica precipitation and silica particle agglomeration. In a third form of the invention a reactor clarifier defines a reaction zone of particulate material in which silica precipitation is initiated and promoted, and also a clarification zone of particulate material in which a floating silica sludge blanket is established through which the brine slowly upwells for further silica precipitation and silica particle agglomeration. In all three forms of the invention atmospheric oxygen is positively excluded from the geothermal brine throughout its flow path, and particularly in the equipment in which the zone of particulate material is established where the large size of vessels necessitated by the slow silica precipitation reaction time has enabled atmospheric oxygen to freely mix with the brine in prior art systems, so as to prevent any occurrence of the aforesaid hydrolysis reaction and its damaging consequences.

BRIEF DESCRIPTION OF THE DRAWINGS

These and other objects of the invention will become more apparent in view of the following description and the accompanying drawings, wherein:

FIG. 2 is a diagrammatic view illustrating another form of the invention in which the brine-particle contact zone is established in the form of a floating silica sludge blanket in "Baker" settling tank means;

FIG. 3 is an enlarged, fragmentary cross-sectional view taken on the 3—3 in FIG. 2.

DETAILED DESCRIPTION

Figure 1:
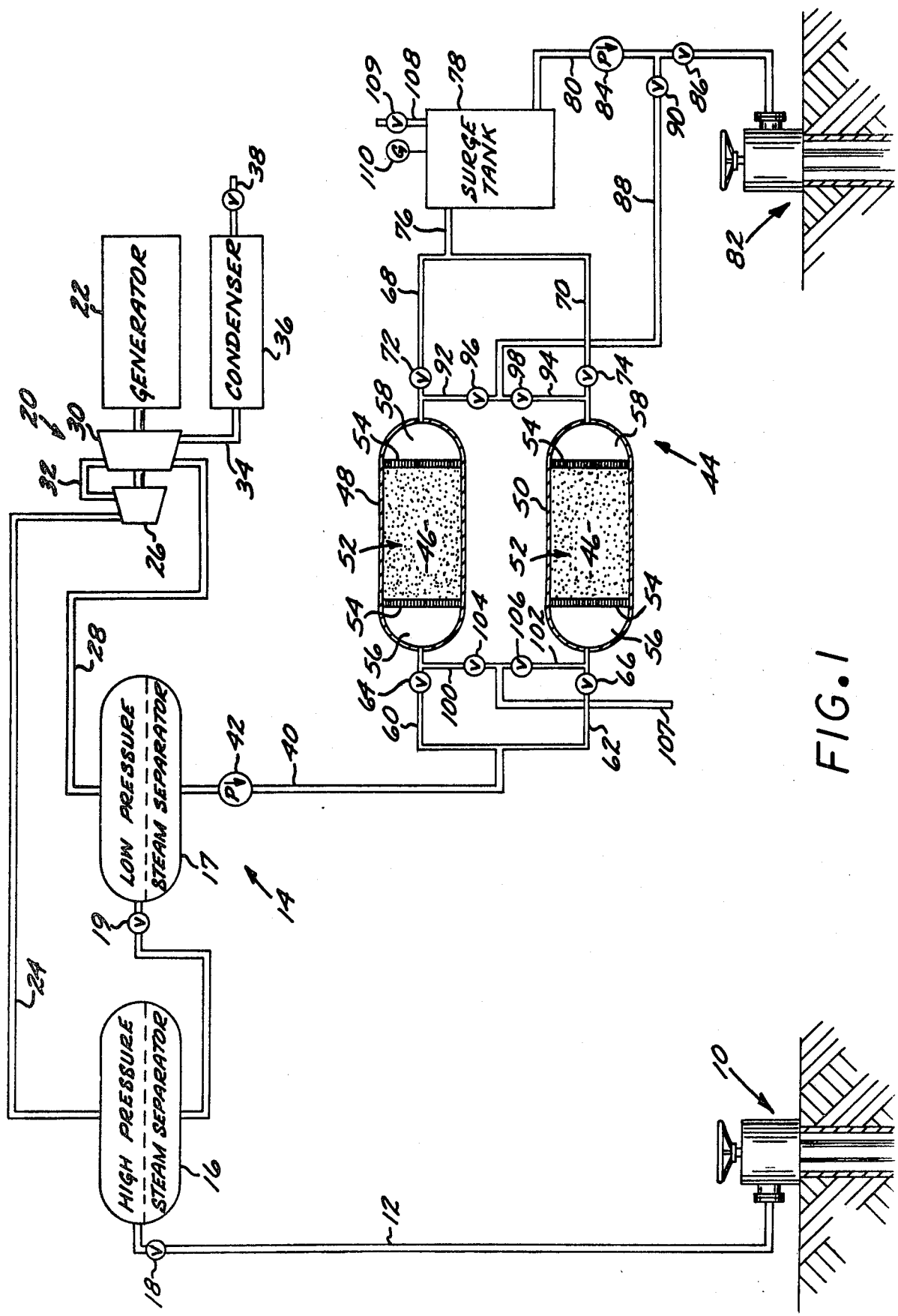
FIG. 1 is a diagrammatic view illustrating a form of the invention in which the brine-particle contact zone is established by stationary particle bed means.

Referring to FIG. 1 of the drawings, a geothermal production well generally designated 10 provides underground access to hot geothermal brine of the type to which the present invention is applicable, namely, hot geothermal brine having physical and chemical characteristics which make it particularly attractive as a source of heat energy for the production of electrical power, but which characteristics have, because of the limitations of prior art technology in this field, heretofore precluded the commercial production of electrical power from such brine. The principal physical characteristic of the hot geothermal brine is that it should have a sufficiently high underground source temperature to enable the brine to be flowed up through the well under the power of its own flashing steam, yet with the brine temperature still remaining sufficiently high at the wellhead for the efficient operation of an electrical power generating plant. For this purpose it is preferred that the source or bottom hole temperature of the geothermal brine be at least about 450° F., and the wellhead temperature be at least about 350° F.

A chemical characteristic of such high temperature source geothermal brine is that it will normally have a high concentration of dissolved silica therein, which is a result of the greatly increased solubility of underground source silica rock formations at high source temperatures as compared with solubility of silica at lower source temperatures. This characteristically high dissolved silica content of very hot geothermal brine sources has, prior to the present invention, been a major obstacle to the commercial production of electrical power despite very large amounts of thermal energy present in such brine sources, because of the precipitation of large amounts of silica as the temperature of the brine is lowered through a plant system. The silica precipitates principally in the form of a hard, rock-like amorphous glaze, and the amount of such silica precipitation increases drastically as the brine moves into and through reinjection equipment, because of the rapidly lowering silica saturation level at such temperatures, and because the slow silica precipitation reaction has already had a considerable amount of time to operate in the supersaturated condition upstream of the reinjection facility. Thus, the quantity of silica scale formation tends to be greater in reinjection equipment than in other parts of a plant.

Not only is the amount of silica precipitation greater in reinjection equipment, but the resulting problem is much more difficult to cope with in the reinjection facility than in other parts of the plant. Thus, while the surface equipment of the plant such as steam separators and piping can either be cleaned out or replaced when the silica buildup becomes too great, silica precipitation within a reinjection well casing can cause rapid plugging that will lead to loss of the well. Under the present state of the art, there is no practical way to clean out such a silica-plugged reinjection well, so that it would then be necessary to drill and case a new reinjection well, at great expense.

Another chemical characteristic of such high temperature source geothermal brine is that it may have a very high chloride salt content, as for example from about 200,000 to about 360,000 parts per million of chloride salts after the geothermal brine has been flashed to atmospheric pressure. It is well recognized in the art that where the salinity is so high, the brine has little or no capacity for the absorption of atmospheric oxygen, and consequently prior art attempts to remove silica from the geothermal brine prior to reinjection gave no consideration to the exclusion of atmospheric oxygen from contact with the brine flow stream. What was not recognized in the prior art was that brines of the character under consideration had an additional combination of chemical characteristics which, in the presence of atmospheric oxygen, resulted in an iron hydrolysis reaction which caused a lot of iron to precipitate out, increasing the reinjection well plugging problem, and which also reduced the pH of the brine, making it much more acidic and corrosive to the reinjection well casing and to other reinjection equipment.

This additional combination of chemical characteristics of the brine includes (1) the brine being in a very reduced oxidation state, and (2) the brine having a large dissolved iron content, the iron being in its chemically reduced ferrous ($Fe^2$) state. Despite the normal incapacity of such highly saline brine to absorb oxygen, the very reduced oxidation state of the brine enables atmospheric oxygen to which the brine may be exposed to chemically combine with the reduced iron in the brine in a reversible hydrolysis reaction as follows:

$$4Fe^2 + 4H^+ + O_2 = 4Fe^3 + 2H_2O$$

$$Fe^3 + 3H_2O = Fe(OH)_3 + 3H^+$$

This hydrolysis reaction results in the formation of a considerable quantity of suspended solids, which of course is contrary to the result that is being sought, namely, reduction of solids precipitating from the brine.

It also results in the brine stream becoming considerably more acidic. Thus whereas the pH of the brine is typically approximately 5.5, the 3H$^+$ produced in the above hydrolysis reaction will cause the pH to be reduced to approximately 5.1. While the brine is already quite corrosive at a pH of approximately 5.5, such reduction of the pH to approximately 5.1 would cause the brine to become unacceptably corrosive to the carbon steel that must be employed in the reinjection piping and the reinjection well casing. In the deep formation wells of the Salton Sea geothermal field which contain up to about 1500 ppm Fe$^{2+}$, a pH drop from 5.5 to 2.8 has been measured in the presence of air.

According to the present invention, the above hydrolysis reaction and its damaging consequences are prevented from taking place by the positive exclusion of atmospheric oxygen from the geothermal brine throughout the flow path of the brine, and particularly in silica removal equipment proximate the tail end of the plant where the large size of tanks necessitated by the slow precipitation reaction time has enabled atmospheric oxygen to freely enter and mix with the brine in prior art systems.

An example of a geothermal resource to which the present invention is applicable is the Salton Sea geothermal field, sometimes referred to as the "Salton Sea geothermal anomaly", located in the Niland region of the Imperial Valley in California. Another example of a geothermal resource to which the present invention applies is the Brawley geothermal field, also in the Imperial Valley. Several geothermal wells have been drilled to different depths by Magma Power Company of Los Angeles, California in the Salton Sea geothermal field, and the applicants and others associated with Magma Power Company have extensively tested brines supplied from these wells. A relatively shallow one of these wells provides geothermal brine at a bottom hole source depth of 2100 feet which has a temperature of about 515° F. to 520° F. The brine from this well contains between about 550 and 600 ppm dissolved silica (SiO$_2$); approximately 250 ppm ferrous iron (Fe$^{2+}$); and has a chloride salt content of approximately 220,000 ppm when flashed to atmospheric pressure, consisting of approximately 4 parts sodium chloride, 2 parts calcium chloride and 1 part potassium chloride. A deeper one of the Magma Power Company wells in the Salton Sea geothermal field provides access to geothermal brine at a depth of approximately 4000 feet and produces brine having a source temperature of approximately 620° F. The brine from this well has approximately the same proportion of dissolved silica as found in the brine from the 2100 foot deep source, but has greatly increased proportions of ferrous iron and chloride salts than the shallower well. Thus, the brine from this deeper well contains approximately 1100 ppm ferrous iron, and contains approximately 300,000 ppm chloride salts when flashed, in approximately the same relative proportions of sodium chloride, calcium chloride and potassium chloride as the brine from the shallower well.

There is also a non-condensable gas content of the brine in the Salton Sea geothermal field which is similar for both the shallower and deeper wells, ranging from about 0.1 to about 0.3 percent by weight of the total brine flow, with approximately 98% of this non-condensable gas being carbon dioxide (CO$_2$).

In the Brawley geothermal field, test wells with depths on the order of about 6000 to 8000 feet have produced geothermal brines having source temperatures of about 500° F. to 550° F., with about 500 to 600 ppm dissolved silica, with on the order of about 500 ppm ferrous iron, with up to about 220,000 ppm chloride salt content and with a considerably higher non-condensable gas content, primarily CO$_2$, than in brines from the Salton Sea geothermal field.

The drawings show three forms of the present invention, each of which may be used alone or in combination with either or both of the other forms in a geothermal power plant which derives its energy from high temperature, high silica content geothermal brine, for greatly reducing the silica content of the brine, preferably down to approximately the saturated level at reinjection temperatures, so as to avoid plugging of the reinjection well with precipitated and/or precipitating silica. In each of the three forms of the invention a zone of particulate material is established through which the main geothermal brine stream of the plant passes prior to reinjection. The particulate material in this zone presents a very large overall surface area which is in contact with the brine, and the brine flow is regulated through the particulate zone so that the brine has an extended residency time of contact with the particulate material, which enables a large quantity of silica to precipitate out from the brine stream despite the slow nature of the silica precipitation reaction. The silica precipitates out of the brine onto the surfaces of the particles, starting with minute monomer silica (SiO$_2$) and growing into polymeric silica (SiO$_{2n}$). With a sufficiently large particle surface area and a sufficiently long residency time in the brine-particle contact zone, it is possible by means of the present invention to reduce the concentration of silica in the brine to approximately the saturation level at reinjection temperatures, and possibly even slightly below such saturation level.

Figure 4:
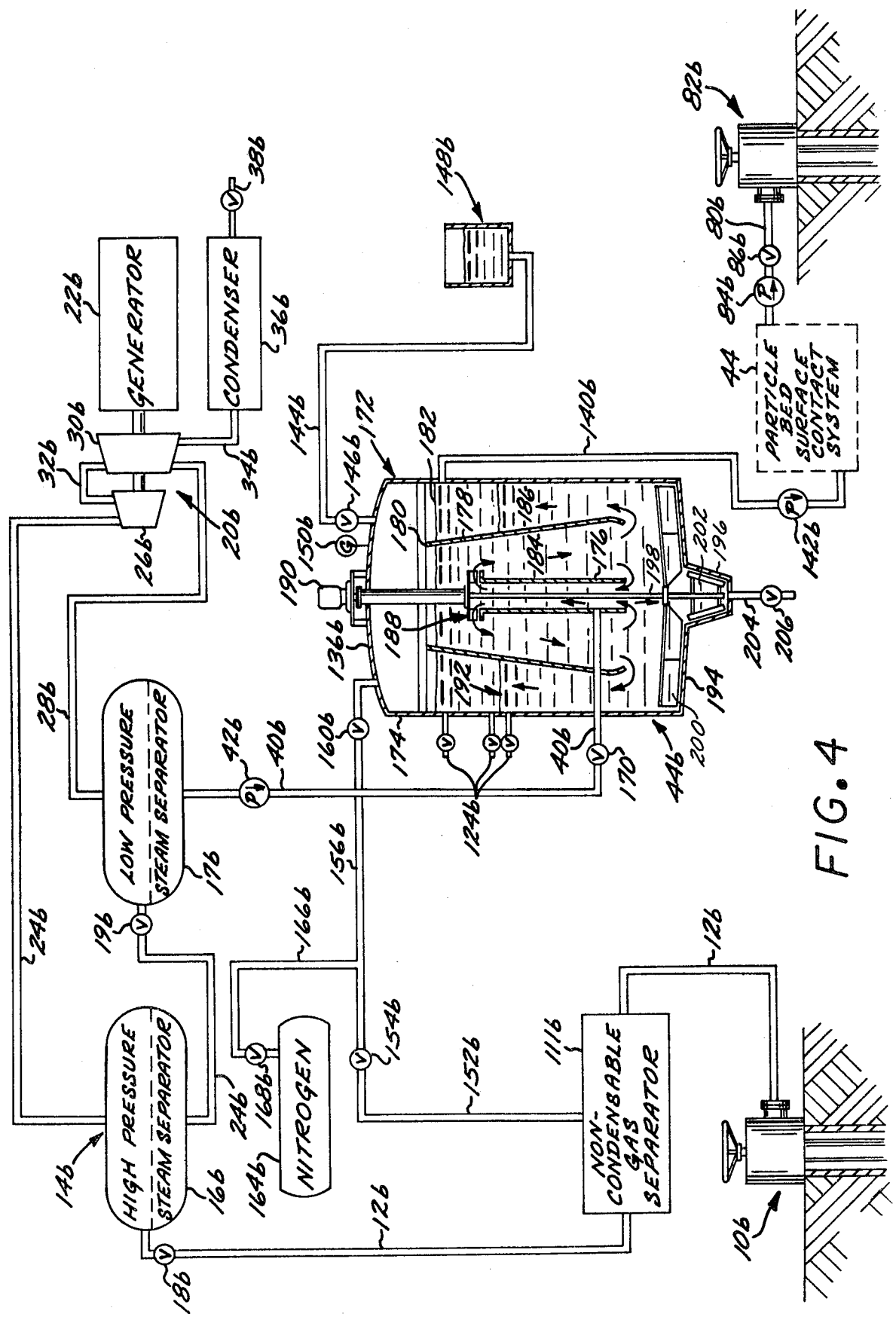
FIG. 4 is a diagrammatic view illustrating a further form of the invention in which the brine-particle contact zone is established in the form of a floating silica sludge blanket in reactor clarifier means.

In the form of the invention shown in FIG. 1 the brine-particle contact zone is established by means of one or more stationary particle beds, while in each of the forms of the invention shown in FIGS. 2 and 4 the brine-particle contact zone is established in the form of a floating silica sludge blanket.

Referring again to FIG. 1, high temperature geothermal brine of the character described hereinabove is delivered from geothermal production well 10 through a supply conduit 12 to heat extraction and generating means generally designated 14. For illustrative purposes a simplified heat extraction and generating means 14 has been shown which has two steam separators that provide steam to respective high and low pressure turbine stages. However, it is to be understood that any type of heat extraction and generating means may be employed within the scope of the invention, including but not limited to steam separation and direct steam turbine generating means, steam separation and transfer of heat energy from the steam into one or more power or working fluid in a binary system, restraining the brine from flashing and transferring heat therefrom to one or more power or working fluid in a binary system, or any combination of such systems.

The hot geothermal brine from supply conduit 12 is passed through a series of steam separators 16 and 17 which have respective flash control valves 18 and 19 associated therewith, flashed steam from separators 16 and 17 powering steam turbine apparatus generally designated 20 which drives electric power generator 22. The steam separators 16 and 17 may be of any desired type, although it is presently preferred to employ flash crystallizers for the steam separators 16 and 17 as shown and described in detail in a concurrently filed application for United States Letters Patent of John L. Featherstone for "Geothermal Plant Silica Control System". Steam from the first or high pressure steam separator 16 is delivered through high pressure steam conduit 24 to a high pressure condensing steam turbine stage 26, while steam from the second or low pressure steam separator 17 is delivered through low pressure steam conduit 28 to a low pressure condensing turbine stage 30. The low pressure stage 30 of turbine apparatus 20 may also receive low pressure steam through an exhaust conduit 32 from the high pressure stage 26. The exhaust conduit 34 from low pressure turbine stage 30 leads to a condenser 36, the output 38 of which provides distilled water as a byproduct of the system that is very useful as cooling water.

The thermally spent geothermal brine leaves low pressure steam separator 17 through an outlet conduit 40 having a pump 42 therein which pumps the brine through solids contact apparatus generally designated 44. In this form of the invention the solids contact apparatus 44 comprises a pair of stationary particle beds each generally designated 46 and consisting of particulate contact material for seeding the precipitation of silica from its supersaturated solution condition in the spent brine, and for filtering out any precipitated silica particles that may be in suspension in the flowing brine steam. The particulate solids contact material in the particle beds 46 may be any material capable of seeding the precipitation of silica. Experiments have shown that steel machine cuttings or filings are suitable for this purpose. Such machine cuttings provide a large amount of surface area, while at the same time retain considerable interstitial spacing which allows the brine stream to flow freely therethrough. Thus, each of the two stationary particle beds 46 defines a brine-particle contact zone.

The stationary particle beds 46 are contained in respective large cylindrical tanks 48 and 50. Each of the tanks 48 and 50 has a cylindrical compartment 52 within which the respective particle bed 46 is contained, each cylindrical compartment 52 being defined between a pair of perforated end partitions 54. Inlet and outlet headers 56 and 58, respectively, in each of the tanks 48 and 50 allow for generally even flow of the spent brine stream through the particle beds 46.

Each of the stationary particle beds 46 holds a large volume of brine in the interstitial spaces thereof relative to the rate of brine inflow to the particle bed and outflow from the particle bed. This greatly slows down the velocity of the brine as it flows through a particle bed 46, so that the brine will have an extended residency time for silica precipitation in the particle bed 46. This is necessary because of the slowness of the silica precipitation reaction. Each of the particle beds 46 is preferably sized relative to the flow rate of the brine stream so that with the entire brine stream directed through one of the particle beds 46, the residency time of the brine in the particle bed 46 will be on the order of from about 8 minutes to about 12 minutes.

The particle bed tanks 48 and 50 are in a parallel brine flow path arrangement with suitable piping and valving to enable the spent brine stream to be conducted through either one of the tanks 48 or 50, or simultaneously through both of the tanks 48 and 50; and also to provide a backflash capability for cleaning the particle beds 46 in tanks 48 and 50. The brine outlet conduit 40 from heat extraction and generating means 14 divides into a pair of brine inlet conduits 60 and 62 which connect to the inlet headers 56 of the respective tanks 48 and 50. Valves 64 and 66 in respective inlet conduits 60 and 62 enable the spent brine to be directed to either one of the particle bed tanks 48 and 50, or simultaneously to both of the tanks 48 and 50. Brine outlet conduits 68 and 70 connect to the outlet headers 58 of respective tanks 48 and 50 to receive silica-depleted brine therefrom. The brine outlet conduits 68 and 70 have respective valves 72 and 74 therein which can be manipulated in cooperation with the respective inlet valves 64 and 66 to enable the spent brine to flow through the particle bed 46 of either of the tanks 48 or 50, or simultaneously through the particle beds 46 of both tanks 48 and 50.

The tank outlet conduits 68 and 70 join at a single conduit 76 which conducts the spent, silica-depleted brine to a surge tank 78, from which the brine is pumped through a reinjection conduit 80 to a reinjection well 82 by means of a pump 84 in conduit 80. Brine flow to reinjection well 82 is controlled by a valve 86 in reinjection conduit 80.

The surge tank 78 is useful for providing surge capacity in the reinjection system, and is also useful as a source of brine for backflushing the particle beds 46. The backflush system also includes a backflush pressure conduit 88 which connects to reinjection conduit 80 at a location between the reinjection pump 84 and reinjection control valve 86. Backflush conduit 88 has a flow control valve 90 therein, and divides into a pair of backflush pressure conduits 92 and 94 which have respective valves 96 and 98 therein. Backflush pressure conduit 92 connects to brine outlet conduit 68 from tank 48 at a location between tank 48 and valve 72, and backflush pressure conduit 94 connects to outlet conduit 70 from tank 50 between tank 50 and valve 74. A pair of backflush outlet conduits 100 and 102 are connected to respective tank inlet conduits 60 and 62. Backflush outlet conduit 100 connects to inlet conduit 60 between tank 48 and valve 64, and backflush outlet conduit connects to inlet conduit 62 between tank 50 and valve 66. Backflush outlet conduits 100 and 102 have respective valves 104 and 106 therein, and join at a single backflush discharge conduit 107 which leads to a solids collection point (not shown).

Brine flow and pressurization for backflushing is provided by the reinjection pump 84, all or part of the reinjection flow stream being diverted from reinjection well 82 by opening normally closed valve 90 in backflush pressure conduit 88 and at least partially closing the reinjection flow control valve 86. If it is desired to backflush the particle bed tank 48 only, then its respective inlet and outlet conduit valves 64 and 72 are closed, and normally closed backflush valves 96 and 104 in respective conduits 92 and 100 are opened. Backflush valves 98 and 106 in respective backflush conduits 94 and 102 associated with the other tank 50 are kept in their normally closed positions. Brine for backflushing the particle bed 46 in tank 48 is then pumped by pump 84 from surge tank 78 through a portion of reinjection conduit 80, then through backflush pressure conduits 88 and 92 and through a portion of tank outlet conduit 68 into header 58 of tank 48. The backflush brine then flows through particle bed 46 in tank 48, washing particulate silica from the particle bed, and is collected in header 56 and flows out of tank 48 through a portion of inlet conduit 60, through backflush outlet conduit 100, and out of the system through backflush discharge conduit 107. Backflushing is preferably continued until the effluent from backflush discharge conduit 107 visually appears clear. While tank 48 is thus being backflushed, the other particle bed tank 50 may be operating in its normal mode for reducing the silica content of the spent brine prior to reinjection, without any interference from the backflushing operation that is taking place in tank 48.

When the backflushing of tank 48 has been completed, the tank 48 may be placed in an inoperative or rest mode by closing backflush valves 90, 96 and 104; and the tank 48 may then be placed in its normal operating mode for reducing the silica content of the spent brine by opening its respective inlet and outlet valves 64 and 72. When a backflushing operation has been completed, the reinjection valve 86 will be reopened to its normal operating position.

Backflushing of the other particle bed tank 50 is accomplished in a similar manner, by closing the respective inlet and outlet valves 66 and 74 of the tank 50, at least partially closing the reinjection valve 86, and opening the normally closed backflush valves 90, 98 and 106, while leaving the backflush valves 96 and 104 closed.

Despite periodic backflushing of the silica removal portion of the plant reinjection system, silica seeding will result in the eventual buildup of sufficient amorphous silica on the particles in the particle beds 46 to slow down the flow of reinjection brine through the beds 46 enough to require replacement of the particles. This can be done in one of the tanks 48 or 50 while the reinjection system is still operating through the other tank.

The spent geothermal brine will be under pressure after flashing in low pressure steam separator 17, and hence will still be under pressure as it passes through the separator outlet conduit 40 to the reinjection system which includes the solids contact silica removal apparatus 44, the reinjection well 82, and all of the associated piping, tanks and valves. This entire reinjection equipment downstream of the low pressure steam separator 17 is sealed against entry of any atmospheric oxygen at any point therein, and in addition to such sealing the entire system is purged of all atmospheric oxygen upon initiation of a cycle of operation of the plant, and then is held in a pressurized condition for positive exclusion of atmospheric oxygen while in operation. Thus, all of the conduits, pumps, valves, and the tanks including particle bed tanks 48 and 50 and surge tank 78, between low pressure steam separator 17 and reinjection well 82 are positively sealed against entry of atmospheric oxygen. The surge tank 78 is covered, and the cover has vent 108 to atmosphere which has one-way pressure valve 109 therein that is adapted to release steam vapor from within the surge tank 78 at a pressure slightly above atmospheric pressure. This pressure can be monitored by a pressure gauge 110 associated with surge tank 78, and is preferably at least about psig (pounds per square inch gauge) to assure that the system remains pressurized against entry of any atmospheric oxygen, despite surges in the system, and in particular despite pressure variations which may occur as a result of backflushing. To assure that a positive pressure condition is maintained in the system during backflushing, it is preferred to backflush only a single one of the particle bed tanks 48 and 50 at a time, while simultaneously maintaining the other particle bed tank 48 or 50 in its normal silica-removal mode of operation so as to keep the pressurized flow of spent geothermal brine coming into the reinjection system. Thus, as backflush brine is removed from surge tank 78, it will be continually replaced by incoming normal flow brine so as to maintain a relatively constant pressurized condition in surge tank 78 and its associated piping.

The brine from low pressure steam separator 17 after flashing will typically have a temperature on the order of about 240° F. and be at a pressure on the order of about 7 psig. The presently preferred means for maintaining a positive pressure condition in the entire reinjection system downstream of low pressure steam separator 17 is to thermally insulate the reinjection system so as to maintain the temperature of the brine therein sufficiently above the boiling point of the brine so that the water vapor pressure above the surface of the brine in surge tank 78 is above atmospheric pressure, and preferably at least about 1.0 psig. If, for example, the brine after flashing had a chloride salt content of 220,000 ppm (as in the brine from the 2100 foot deep Magma Power Company well referred to above) then the boiling point of such brine would be approximately 225° F., and so the temperature of the entire reinjection system downstream of low pressure steam separator 17 would preferably be maintained at least as high as about 228° F. to maintain the preferred pressure of 1.0 psig.

On the other hand, the temperature of the brine may be allowed to fall below the boiling point of the brine in the reinjection system, provided that the pumps 42 and 84, and the various valves in the system, are adjusted to maintain a positive pressure of the brine in the system.

In the form of the invention shown in FIG. 2, the solids contact zone of particulate material is established in the form of a floating silica sludge blanket through which the brine sequentially flows in each of a series of large "Baker" settling tanks.

Referring to FIG. 2, high temperature geothermal brine of the character described above is delivered from a geothermal production well 10a through a supply conduit 12a having a non-condensable gas separator 111 therein to heat extraction and generating means generally designated 14a. Non-condensable gas separated from the hot geothermal brine stream in separator 111 consists principally of carbon dioxide, and this may be utilized to advantage in the settling tank system of FIG. 2. As in FIG. 1, the heat extraction and generating means 14a shown in FIG. 2 is, for illustrative purposes, a simplified system embodying steam separators and direct steam turbine generating means. However, it is to be understood that any type of heat extraction and generating means may be employed in the system of FIG. 2 within the scope of the invention, as indicated above in connection with FIG. 1.

The hot geothermal brine from supply conduit 12a is passed through a series of steam separators 16a and 17a having respective flash control valves 18a and 19a, flashed steam from separators 16a and 17a energizing steam turbine apparatus 20 which drives electric power generator 22. Steam separators 16a and 17a are preferably of the flash crystallizer type, although any other type steam separators may be employed within the scope of the invention. Steam from the first or high pressure steam separator 16a passes through high pressure steam conduit 24a to high pressure condensing steam turbine stage 26a, while steam from the second or low pressure steam separator 17a passes through low pressure steam conduit 28a to a low pressure condensing turbine stage 30a which may also receive low pressure steam through an exhaust conduit 32a from high pressure stage 26a. The exhaust conduit 34a from low pressure turbine stage 30a leads to a condenser 36a, the output 38a of which provides distilled water as a by-product of the system that is useful as cooling water.

The thermally spent geothermal brine leaves low pressure steam separator 17 through an outlet conduit 40a having a pump 42a therein which pumps the brine through a valve 112 to the reinjection system, the first portion of which is solids contact apparatus that is generally designated 44a. In this form of the invention the solids contact apparatus 44 comprises a series arrangement in the brine flow stream of a plurality of large "Baker" settling tanks 114. Two of the "Baker" settling tanks 114 are shown in FIG. 2, although it is to be understood that any number of the "Baker" settling tanks may be employed within the scope of the invention. The "Baker" settling tanks are preferably arranged for gravity flow of the reinjection brine from one to the other in the series flow arrangement.

The spent geothermal brine passes from low pressure steam separator 17a through conduit 40a to a header 115 that provides substantially equal distribution of brine flow in each of a plurality of brine distribution tubes located in the lower portion of the first "Baker" settling tank 114. The distribution tubes 116 are generally horizontal, and extend substantially the length of the "Baker" tank 114; and they are substantially uniformly spaced apart across the width of the "Baker" tank 114. Three of the longitudinal distribution tubes 116 are shown in tank 114, although it is to be understood that any number of the distribution tubes 116 may be employed within the scope of the invention. A series of perforations 118 is longitudinally distributed along the length of each of the distribution tubes 116 for substantially uniform, upwardly directed introduction of the entire brine flow stream across substantially the entire inside area of the lower portion of "Baker" tank 114. Preferably the perforations 118 taper along the lengths of the distribution tubes 116 from relatively small apertures proximate the header 115 to relatively large apertures proximate the free ends of the distribution tubes 116 so that as fluid pressure drops along the lengths of the distribution tubes 116 the outflow of brine will nevertheless remain substantially constant.

Each of the "Baker" tanks preferably has inclined side walls that provide a continuously increasing cross-sectional area from bottom to top within the tank. As the brine is released from the distribution tubes 116 through perforations 118 into the lower portion of tank 114, there is a great increase in the overall cross section of the flow path, whereby the velocity of the brine is slowed down to a slow upwelling of the brine stream over the entire horizontal cross section of the inside of the tank just above the distribution tubes 116. Then, there is a further, continuous reduction in the already very slow upwelling velocity of the brine as the horizontal cross section of the tank 114 increases in the upward direction. These reductions in the flow velocity of the brine initiate a silica precipitation reaction, and cause that reaction to increase, as the brine is released into the tank 114 and moves slowly upwardly therein. This precipitation reaction will involve the initial precipitation of monomer silica particles $SiO_2$, and will also involve polymeric precipitation of silica $(SiO_2)_n$ on such initially formed monomer particles and on silica particles that may have precipitated upstream of the tank 114 and are in suspended form in the brine flow stream that enters the tank 114. Substantially all of the silica which precipitates in the tank 114 will precipitate in suspended, particulate form in the brine.

As the velocity of the upwelling brine decreases because of the increasing horizontal cross section of the tank 114, at some level within the body of brine in tank 114 this upward velocity of the brine will equal the downward velocity of the majority of silica particles under Stokes' law, and a floating sludge blanket generally designated 120 will be caused to form and remain at that level. This sludge blanket 120 provides a high density, and hence high surface area, zone of the suspended silica particles in which silica particle agglomeration and further silica precipitation occurs. When particles enlarge to a certain size, either by continued precipitation reaction thereon or by agglomeration, or both, then according to Stokes' law these heavier particles will be enabled to descend countercurrent through the upwelling brine in tank 114 and drop down to the bottom of the tank. This floating sludge blanket will be somewhat below the surface 122 of the brine in tank 114. If desired, a series of fluid monitoring ports 124 may be provided in a wall of the tank 114 to enable the clarity of the reinjection brine to be monitored proximate the exit level, which is near the surface 122, and to permit the density and vertical level of the silica sludge blanket 120 to be monitored.

Tests indicate that for the efficient establishment and operation of a silica sludge blanket in each "Baker" tank in the reinjection system it is preferable to size each tank relative to the flow rate of the brine stream so that the brine has a residency time of at least about 15 minutes and preferably from about 15 minutes to about 30 minutes.

The descending heavier silica particles build up in the bottom of the tank 114 in the form of a thick silica slurry which leaves the tank 114 through a discharge conduit 126 at a flow rate controlled by a valve 128 therein. The silica slurry is concentrated toward the axial center of the bottom of tank 114 by providing the bottom wall 130 of tank 114 with a shallow V shape in cross section. A semicylindrical longitudinal recess 132 in the center of bottom wall 130 receives the silica slurry as it concentrates toward the center of the bottom wall, and a screw conveyor 134 in semicylindrical recess 132 moves the slurry either continuously or intermittently along the bottom of tank 114 to slurry discharge conduit 126.

"Baker" settling tank 114 has a cover 136 which is positively sealed against entry of atmospheric oxygen. A normally sealed manhole 138 allows for manual cleaning of the inside of tank 114.

The primary stream of spent brine is conducted from "Baker" settling tank 114 through an overflow outlet conduit 140 which may have a valve 142 therein and is delivered to a second "Baker" settling tank generally designated 114a through a header 115a that delivers the brine to a plurality of distribution tubes 116a that correspond in both configuration and location to the distribution tubes 116 in tank 114. The second "Baker" settling tank 114a has the same construction and mode of operation as the first "Baker" settling tank 114, as will any additional downstream "Baker" settling tanks that may be arranged in the reinjection brine flow stream downstream of the "Baker" settling tanks 114 and 114a. Thus, a sludge blanket 120a is established in tank 114a below the brine surface level 122a, and fluid monitoring ports 124a may be provided to check the clarity of the brine after it has flowed upwardly through the sludge blanket, and to check the sludge blanket. Silica slurry which accumulates in the bottom of tank 114a is discharged through a conduit 126a at a rate controlled by valve 128a therein. Discharge conduit 126a joins with silica slurry discharge conduit 126 from tank 114, which leads to a solids collection point (not shown). Like tank 114, the tank 114a has a cover thereon which is positively sealed against entry of atmospheric oxygen.

The spent, silica-depleted brine leaves "Baker" tank 114a, and hence solids contact apparatus 44a, through an overflow outlet conduit 40a. If desired, the series of settling tanks in solids contact apparatus 44a may be followed in the spent brine stream by a particle bed surface contact system 44 like that of FIG. 1 to take out any silica that may remain above supersaturation in the spent brine stream. Such a supplemental solids contact apparatus 44 is shown in phantom in FIG. 2, and the brine stream would be pressurized to flow therethrough by means of a pump 142 in outlet conduit 104a. The spent, silica-depleted brine is then pumped through reinjection conduit 80a to reinjection well 82a by pump 84a, with the brine flow to reinjection well 82a being controlled by a valve 86a.

As was the case in the form of the invention shown in FIG. 1, in the form of the invention shown in FIG. 2 the entire reinjection equipment downstream of the low pressure steam separator 17a is sealed against entry of atmospheric oxygen at any point therein, and in addition to such sealing the entire system is purged of all atmospheric oxygen upon initiation of a cycle of operation of the plant. Thus, all of the conduits, pumps, valves, and the tanks including "Baker" tanks 114 and 114a, and also including the entire particle bed surface contact system 44 is such is included in te brine flow path downstream of the "Baker" tanks, between low pressure steam separator 17a and reinjection well 82a are positively sealed against entry of atmospheric oxygen.

As further assurance against entry of atmospheric oxygen, it is also desirable to maintain the entire reinjection system between low pressure steam separator 17a and reinjection well 82a at least slightly above atmospheric pressure. However, in the form of the invention in FIG. 2 such pressure should only be slightly above atmospheric pressure because of the very large size of each of the "Baker" tanks and the consequently large forces that would be produced by any substantial pressure. Although such slight positive pressure can be maintained in the system of FIG. 2 by maintaining the temperature of the brine at or slightly above the boiling point, this would be very difficult to do in the system of FIG. 2 because the long dwell time of the brine in each of the "Baker" tanks 114 and 114a tends to allow some cooling even with the entire reinjection system downstream of steam separator 17a thermally insulated as is preferred. Accordingly, alternative means many be provided in the reinjection system of FIG. 2 for maintaining this slight positive pressure. Such alternative pressurization means may utilize the generally non-reactive non-condensable gas separated out of the production brine stream by non-condensable gas separator 111, or may utilize some other essentially inert gas such as nitrogen.

Steam vapor or the alternative pressurizing gas is caused to purge the "Baker" tank 114 of any air that may be present at the initiation of any cycle of operation of the plant and is maintained at the slightly positive pressure in "Baker" tank 114 by venting any initial air and the steam vapor or other gas through a vent conduit 144 that communicates with the inside of tank 114 above the brine surface level 122, the vent conduit 144 having a one-way pressure valve 146 therein. However, if it is desired to have the pressure within "Baker" tank 114 at approximately atmospheric pressure after the initial purging, then the valve 146 may be omitted or opened, and the vent conduit 144 may be vented through a liquid gas trap generally designated 148. Similarly, any initial air that may be present in "Bake" tank 114a is purged through a vent conduit 144a having a one-way valve 146a therein which leads from tank 114a above brine surface level 122a. If a slight positive pressure is desired to be maintained in tank 114a, the valve 146a may be employed to maintain it, whereas if approximately atmospheric pressure is desired to be maintained within tank 114a, the valve 146a may be omitted or opened, and vent conduit 144a vented through gas trap 148. The pressure above the brine in "Baker" tank 114 may be monitored by a pressure gauge 150, while that in tank 114a may be monitored by a pressure gauge 150a. The pressure in each of the tanks 114 and 114a is preferably maintained within the range of between approximately atmospheric pressure and approximately 1.0 psig.

The alternative use of the principally carbon dioxide non-condensable gas produced in the system is enabled by connecting the gas output of non-condensable gas separator 11 through a conduit 152 and a conduit 156 to "Baker" tank 114 above the brine surface level 122; and through the conduit 152 and a conduit 158 to the "Baker" tank 114a above the brine surface level 122a. Opening of a valve 154 in the non-condensable gas conduit 152 from separator 111 enables the non-condensable gas to flow to the two "Baker" tanks through the respective conduits 156 and 158, and the flow rate required to maintain at least atmospheric pressure or slightly above in each of the tanks 114 and 114a is controlled by valves 160 and 162 in the respective gas conduits 156 and 158.

Another alternative source of essentially inert gas for maintaining the pressure in tanks 114 and 114a at or slightly above atmospheric pressure is a source of supply 164 of nitrogen which may be connected to the two "Baker" tank conduits 156 and 158 through a nitrogen conduit 166 by closing the non-condensable gas valve 154 and opening a nitrogen valve 168 in nitrogen conduit 166.

Both the non-condensable gas separated by separator 111 and the nitrogen in source 164 will be under considerable pressure so that pumping would not be required for delivering either of these gases to the "Baker" tanks.

In the form of the invention shown in FIG. 4, the solids contact zone of particulate material is a floating silica sludge blanket that is established in a reactor clarifier.

Referring to FIG. 4, high temperature geothermal brine of the character described above is described from geothermal production well 10b through supply conduit 12b having non-condensable gas separator 111b therein to heat extraction and generating means generally designated 14b. As in FIGS. 1 and 2, the heat extraction and generating means 14b shown in FIG. 4 is, for illustrative purposes, a simplified system, embodying steam separators and direct steam turbine generating means; it is to be understood, however, that any type of heat extraction and generating means may be employed in the system of FIG. 4 within the scope of the invention, as indicated above in connection with FIGS. 1 and 2.

The hot geothermal brine from supply conduit 12b is passed through steam separators 16b and 17b having respective flash control valves 18b and 19b, steam from separators 16b and 17b energizing steam turbine apparatus 20b which drives electric power generator 22b. Steam separators 16b and 17b are preferably, but not necessarily, flash crystallizers. Steam from separator 16b is directed through conduit 24b to high pressure condensing steam turbine stage 26b, while steam from separator 17b is directed through conduit 28b to low pressure condensing turbine stage 30b which may also receive low pressure steam through exhaust conduit 32b from high pressure stage 26b. Exhaust conduit 34b from low pressure turbine stage 30b leads to condenser 36b, the output 38b of which provides distilled water as a byproduct of the system that is useful as cooling water.

The thermally spent geothermal brine leaves low pressure steam separator 17b through an outlet conduit 40b having a pump 42b therein which pumps the brine through a valve 170 to the reinjection system, the first portion of which is solids contact apparatus generally designated 44b. In this form of the invention the solids contact apparatus 44b comprises a reactor clarifier generally designated 172 wherein the brine is allowed to flash to approximately atmospheric pressure or slightly above atmospheric pressure, which will then lower the temperature of the brine to a level that is close to the reinjection temperature, and consequently will lower the saturation level for silica in the brine to approximately the saturation level for reinjection. As an alternative to flashing into the reactor clarifier 172, a flash tank (not shown) could be disposed immediately upstream of the reactor clarifier 172.

The reactor clarifier serves several purposes in the present invention. First, it causes the initiation of a silica precipitation reaction wherein monomer silica particles $SiO_2$ are precipitated in suspended, particulate form in the brine. Second, it causes continued, polymeric precipitation of silica $(SiO_2)_n$ on such initially formed monomer particles and on silica particles that may have precipitated upstream of the reactor clarifier 172 and are in suspended form in the brine flow stream that enters the reactor clarifier 172. The reactor clarifier 172 is so efficient in promoting the silica precipitation reaction that it will cause the dissolved silica content to be lowered from supersaturated to approximately saturated for the temperature of the brine in the reactor clarifier 172, or possibly even slightly below saturation at that temperature. Third, the reactor clarifier 172 "clarifies" the brine by removing substantially all of the precipitated, particulate silica from the reinjection brine flow stream, except only for a very minor quantity of extremely fine silica particles which would not be in any way harmful to the reinjection wall.

The reactor clarifier 172 has a large, upright cylindrical outer shell 174, with a central vertical draft tube 176 coaxially supported therein. Coaxially supported intermediate the outer shell 174 and central draft tube 176 is a downwardly flaring frusto-conical shell 178 which is radially inwardly cupped proximate its lower end. The lower end of draft tube 176 and frusto-conical shell 178 are at approximately the same level spaced above the bottom of reactor clarifier 172. The upper end 180 of frusto-conical shell 178 extends above the surface level 182 of the brine in reactor clarifier 172, while the upper end of the central draft tube 176 is submerged considerably below the surface level 182 of the brine. A reaction zone or well 184 is defined radially between draft tube 176 and frusto-conical shell 178, and a clarification zone or compartment 186 is defined radially between the frusto-conical shell 178 and the outer cylindrical shell 174. Brine is circulated through the reactor clarifier 172 by means of a turbine pump 188 located at the top of draft tube 176, the pump 188 being driven by a motor 190 which is preferably positioned externally of the reactor clarifier tank. An alternative positioning of the turbine pump 188 to assure against gas binding of the turbine when flashing into reactor clarifier 172 would be in draft tube 176 below inlet conduit 40b.

The flow path through which the reinjection brine circulates in reactor clarifier 172 is as follows: The brine is directed from low pressure steam separator 17b through its outlet conduit 40b into the inside of draft tube 176, where the turbine pump 188 causes the brine to flow upwardly through draft tube 176, radially outwardly through pump 188, downwardly through reaction zone or well 184, radially outwardly around the cupped lower end of frusto-conical shell 178, and thence upwardly through the clarification zone or compartment 186. The mainstream of silica-depleted reinjection brine will overflow out of the reactor clarifier 172 through outlet conduit 140b for delivery to a reinjection well. A large proportion of the brine which flows downwardly from the reaction zone 184 between the concentric draft tube 178 and frusto-conical shell 178 will be drawn back up through the draft tube 176 and recirculated through the reaction zone 184.

The reaction zone or well 184 is a region in which silica will precipitate out in suspended, particulate form, both as originating precipitate particles and as growth upon other silica particles which act as seeds. The downwardly increasing cross section of the reaction zone 184 causes corresponding velocity reduction in the brine to accelerate this precipitation reaction. Similarly, the upwardly increasing cross section of the clarification zone 186 causes a corresponding reduction in velocity of the brine flow, and at some level intermediate the ends of the clarification zone 186 this upward velocity of the brine will equal the downward velocity of te majority of silica particles under Stokes' law, and a floating sludge blanket generally designated 192 will be caused to form and remain at that level. This sludge blanket 192 provides a high density, and hence high surface area, region of the suspended silica particles in which silica particle agglomeration and further silica precipitation occur. When the silica particles enlarge to a certain size, either by continued precipitation reaction thereon or by agglomeration, or both, then according to Stokes' law these heavier particles will be enabled to descend contercurrent through the upwelling brine in clarification zone 186 and drop down into the bottom region of the reactor clarifier 172.

The bottom wall 194, of reactor clarifier 172 has a gentle downward slope from its outer edge inwardly, terminating in a downwardly cupped frusto-conical center thickening section 196. Connected to the motor 190 through a slowly rotating rake drive shaft 198 is a plurality of large rake arms 200 that sweep accumulating silica particles radially inwardly from the gently sloping part of bottom wall 194 into the center thickening section 196. A plurality of small rake arms 202 in the center thickening section 196 produce continued concentration of the silica sludge that is forming proximate the bottom of the reactor clarifier 172 and deliver the thickened sludge or slurry to a discharge conduit 204 through which the slurry passes at a rate controlled by a valve 206 to be delivered to a solids collection point (not shown).

A series of fluid monitoring ports 124c may be provided in the cylindrical shell 174 of reactor clarifier 172 to enable the clarity of the reinjection brine to be monitored proximate the exit level which is near the surface level 182 of the brine, and to permit the density and vertical level of the floating silica sludge blanket 192 to be monitored.

The reactor clarifier 172 holds a large volume of liquid relative to the rate of brine inflow through the conduit 40b and outflow through conduit 140b. The turbine pump 188 is a high volume pump which, with a large volume of liquid in the reactor clarifier 172, produces internal recirculation of silica sludge, preferably as many as ten to fifteen times, up through the draft tube 176, down through the reaction well 184, and then back up through draft tube 176 so as to obtain a large amount of solids contact in the reaction well 184 for seeding of the precipitating silica, with a considerable length of time being thus afforded for silica precipitation, preferably on the order of from about eight minutes to about twelve minutes. The very large silica sludge seeding area available for this extended time interval enables the reactor clarifier 172 to bring the dissolved silica content in the primary reinjection brine flow stream down from a supersaturated condition to approximately saturated, or even slightly below saturated, for the temperature of the brine in the reactor clarifier 172.

The reactor clarifier 172 may, if desired, be followed in the spent brine stream by a particle bed surface contact system 44 like that of FIG. 1 as further assurance that dissolved silica in the reinjection stream is at least as low as the saturated level for the reinjection temperature. Such a supplemental solids contact apparatus 44 is shown in phantom in FIG. 3, and if present the reinjection brine stream 140b leaving reactor clarifier 172 would be pressurized to flow through solids contact apparatus 44 by means of a pump 142b in conduit 140b. The spent, silica-depleted brine is then pumped through reinjection conduit 80b to reinjection well 82b by pump 84b, with the brine flow to reinjection well 82b being controlled by a valve 86b.

As in the forms of the invention shown in FIGS. 1 and 2, in the form of the invention shown in FIG. 4 the entire reinjection system downstream of the low pressure steam separator 17b is sealed against entry of atmospheric oxygen at any point therein, and in addition to such sealing the entire system is purged of all atmospheric oxygen upon initiation of a cycle of operation of the plant. Thus, all of the conduits, pumps, valves, and in particular the reactor clarifier 172, as well as the entire particle bed surface contact system 44 if such is included in the system, between low pressure steam separaor 17b and reinjection well 82b are positively sealed against entry of atmospheric oxygen.

As in the form of the invention shown in FIG. 2, in order to further assure against entry of atmospheric oxygen it is also desirable in the form of the invention shown in FIG. 4 to maintain the entire reinjection system between low pressure steam separator 17b and reinjection well 82b at least slightly above atmospheric pressure. Although the reactor clarifier 172 need not be as large as any one of the "Baker" tanks of FIG. 2, it is nevertheless a large tank in order to achieve the desired brine residency time therein, and consequently large forces would be produced thereon should the pressure in the reactor clarifier 172 be substantially above atmospheric pressure. The desired slight amount of positive pressure can be maintained in the reinjection system of FIG. 4, and particularly in the reactor clarifier 172, by maintaining the temperature of the brine at or slightly above the boiling point.

In the system of FIG. 4, the presently preferred means for maintaining a slightly positive pressure condition in the entire reinjection system downstream of low pressure steam separator 17b, and particularly in the reactor clarifier 172, is to thermally insulate the reinjection system so as to maintain the temperature of the brine therein sufficiently above the boiling point of the brine so that the water vapor pressure above the surface of the brine in reactor clarifier 172 is slightly above atmospheric pressure, and preferably at least about psig. With the brine temperature after flashing in low pressure steam separator 17b typically having a temperature on the order of about 240° F. at the pressure on the order of about 7 psig, there are sufficient temperature and pressure margins above the boiling point and atmospheric pressure, respectively, so that the desired slight positive pressure condition is achievable by thermal insulation of the reinjection system and particularly of the reactor clarifier 172.

Nevertheless, if desired, alternative means similar to that shown in FIG. 2 may be provided in the reinjection system of FIG. 4 for maintaining the desired slight positive pressure. Such alternative pressurization means may utilize the generally non-reactive non-condensable gas separated out of the production brine stream by non-condensable gas separator 111b, or may utilize some other essentially inert gas such as nitrogen.

Steam vapor or an alternative pressurizing gas is caused to purge the reactor clarifier 172 of any air that may be present at the initiation of any cycle of operation of the plant and is maintained at the desired slightly positive pressure in reactor clarifier 172 by providing a cover 136b on reactor clarifier 172 which is positively sealed against entry of atmospheric oxygen, and by venting any initial air and then the steam vapor or other gas through a vent conduit 144a that communicates with the inside of reactor clarifier 172 above the brine surface level 182, the vent conduit 144b having a one-way pressure valve 146b therein. However, after the initial purging the pressure within reactor clarifier 172 may be maintained at approximately atmospheric pressure within the scope of the invention, provided the system includes means for positively excluding atmospheric oxygen. Accordingly, if it is desired to maintain the pressure within reactor clarifier 172 at approximately atmospheric pressure, then the valve 146b may be omitted or opened, and the vent conduit 144b may be vented through a liquid gas trap generally designated 148b that will allow any substantial pressure within the top of reactor clarifier 172 to be relieved, while at the same time porisively blocking entry of atmospheric oxygen into the reactor clarifier 172. The pressure above the brine in reactor clarifier 172 may be monitored by a pressure gauge 150b. The pressure in reactor clarifier 172 is preferably maintained within the range of between approximately atmospheric pressure and approximately 1.0 psig.

For the alternative use of the principally carbon dioxide non-condensable gas produced in the system, the output of non-condensable gas separator 111b is connected to the reactor clarifier 172 above its brine surface level 182 by means of conduits 152b and 156b having respective valves 154b and 160b therein. Opening of the valve 154b in conduit 152b enables the non-condensable gas to flow to the reactor clarifier 172 through conduit 156b, and the flow rate required to maintain at least atmospheric pressure or slightly above in reactor clarifier 172 is controlled by adjustment of the valve 160b.

Another alternative source of essentially inert gas for maintaining the pressure in reactor clarifier 172 at or slightly atmospheric pressure in a source of supply 164b of nitrogen which may be conducted to the reactor clarifier gas supply conduit 156b through a nitrogen conduit 166b by closing the non-condensable gas valve 154b and opening a nitrogen valve 168b in nitrogen conduit 166b.

While the instant invention has shown and described herein in what are conceived to be the most practical and preferred embodiments, it is recognized that departures may be made therefrom within the scope of the invention, which is therefore not to be limited to the details disclosed herein, but is to be accorded the full scope of the appended claims.

We claim:

1. The method of extending the operational life of a reinjection well in a geothermal energy system which has a geothermal brine flow path comprising a production well providing a stream of high temperature, high dissolved silica content geothermal brine, heat extraction means and a reinjection well, which comprises:
   establishing a zone of particulate material in said flow path between said heat extraction means and said reinjection well,
   passing said geothermal brine stream through said zone in contact with said particulate material to seed the precipitation of dissolved silica from said brine onto said particles so as to reduce the amount of dissolved silica available for precipitation in said reinjection well, and
   minimizing the occurrence of other chemical reactions in said zone which would be injurious to said reinjection well by excluding atmospheric oxygen from said zone.

2. The method of claim 1, which comprises slowing down the flow rate of said geothermal brine stream as said stream passes through said zone so as to allow extended time for the silica precipitation reaction to occur.

3. The method of claim 1, wherein particulate material comprises primarily silica.

4. The method of claim 1, which comprises precipitating sufficient dissolved silica from said brine onto said particles to reduce the silica content of the brine at least down to approximately the saturated level for the temperature of the brine stream when it reaches said reinjection well.

5. The method of claim 1, wherein said zone of particulate material comprises a floating sludge blanket comprising primarily silica in said geothermal brine stream.

6. The method of claim 5, wherein silica particle growth occurs in said zone by both precipitation and agglomeration.

7. The method of claim 5, wherein particulate material is prevented from flowing with the brine stream to the reinjection well by collecting particles of said particulate material which have grown heavy enough to descend below the said floating sludge blanket.

8. The method of claim 7, wherein said collected particles are removed from the geothermal brine in the form of a thick slurry.

9. The method of claim 5, wherein said floating sludge blanket is established in vessel means which is positively sealed against entry therein of atmospheric oxygen.

10. The method of claim 9, which comprises maintaining the pressure inside said vessel means at least approximately as high as atmospheric pressure.

11. The method of claim 9, which comprises maintaining the pressure inside said vessel means slightly above atmospheric pressure.

12. The method of claim 9, which comprises maintaining the pressure inside said vessel means at least about 1.0 psig.

13. The method of claim 9, wherein space above the geothermal brine in said vessel means is occupied primarily by steam vapor.

14. The method of claim 13, wherein said geothermal brine stream is introduced into said zone of particulate material at a sufficiently high temperature to produce said steam vapor from the brine, and said zone is thermally insulated so as to maintain the temperature of the brine in said zone sufficiently high to continue the production of steam vapor from the brine.

15. The method of claim 5, wherein said zone of particulate material is established in reactor clarifier means.

16. The method of claim 15, wherein a reaction zone is also established in said reactor clarifier means, precipitation of silica in suspended, particulate form being initiated in said reaction zone.

17. The method of claim 16, wherein said geothermal brine stream is circulated through said reaction zone a plurality of times.

18. The method of claim 16, wherein said geothermal brine stream is circulated through said reaction zone at least about 10 times.

19. The method of claim 15, wherein particulate material is prevented from flowing with the brine stream to the reinjection well by collecting particles of said particulate material which have grown heavy enough to descend below said floating sludge blanket in a collection zone proximate the bottom of said reactor clarifier means, and removing said collected particles from said reactor clarifier means.

20. The method of claim 5, wherein said zone of particulate material is established in "Baker" settling tank means.

21. The method of claim 20, wherein particulate material is prevented from flowing with the brine stream to the reinjection well by collecting particles of said particulate material which have grown heavy enough to descend below said floating sludge blanket in a collection zone proximate the bottom of said "Baker" settling tank means and removing said collected particles from said "Baker" settling tank means.

22. The method of claim 20, wherein said geothermal brine stream has a residency time in said "Baker" settling tank means of at least about 15 minutes.

23. The method of claim 1, wherein said zone of particulate material comprises stationary particle bed means through which said geothermal brine stream flows.

24. The method of claim 23, wherein particulate material is prevented from flowing with the brine stream to the reinjection well by establishing perforated barrier means across, the brine stream downstream of said stationary particle bed means.

25. The method of claim 23, which further comprises periodically backflushing said stationary particle bed means with geothermal brine derived from said stream downstream of said particle bed means so as to clean said particle bed means.

26. The method of claim 23, wherein said geothermal brine stream has a residency time in said stationary particle bed means of at least about 8 minutes.

27. The method of extending the operational life of a reinjection well in a geothermal energy system which has a geothermal brine flow path comprising a production well providing a stream of high temperature, high dissolved silica content geothermal brine, heat extraction means and a reinjection well, which comprises:
 establishing a zone of particulate material in said flow path between said heat extraction means and said reinjection well, said zone comprising a floating sludge blanket comprising primarily silica in said geothermal brine stream,
 passing said geothermal brine stream through said zone in contact with said particulate material to seed the precipitation of dissolved silica from said brine onto said particles so as to reduce the amount of dissolved silica available for precipitation in said reinjection well,
 minimizing the occurrence of other chemical reaction in said zone which would be injurious to said reinjection well by excluding atmospheric oxygen from said zone, said oxygen exclusion being accomplished by establishing said floating sludge blanket in vessel means which is positively sealed against entry therein of atmospheric oxygen and maintaining the pressure inside said vessel means at least approximately as high as atmospheric pressure, and
 venting the inside of said vessel means above the surface level of the brine to atmosphere through one way vent means.

28. The method of extending the operational life of a reinjection well in a geothermal energy system which has a geothermal brine flow path comprising a production well providing a stream of high temperature, high dissolved silica content geothermal brine, heat extraction means and a reinjection well, which comprises:
 establishing a zone of particulate material in said flow path between said heat extraction means and said reinjection well, said zone comprising a floating sludge blanket comprising primarily silica in said geothermal brine stream,
 passing said geothermal brine stream through said zone in contact with said particulate material to seed the precipitation of dissolved silica from said brine onto said particles so as to reduce the amount of dissolved silica available for precipitation in said reinjection well, and
 minimizing the occurrence of other chemical reactions in said zone which would be injurious to said reinjection well by excluding atmospheric oxygen from said zone, said oxygen exclusion being accomplished by establishing said floating sludge blanket in vessel means which is positively sealed against entry therein of atmospheric oxygen, space above the geothermal brine in said vessel means being occupied primarily by substantially non-reactive gas other than steam.

29. The method of claim 28, wherein said gas is non-condensable gas separated out of said geothermal brine stream between said production well and said heat extraction means.

30. The method of claim 28, wherein said gas is nitrogen.

31. In a geothermal energy system which has a geothermal brine flow path comprising a production well providing a stream of high temperature, high dissolved silica content geothermal brine, heat extraction means and a reinjection well, a system for extending the operational life of the reinjection well which comprises:
 vessel means operatively connected in said brine flow path between said heat extraction means and said reinjection well, and
 a zone of particulate material in said vessel means through which said geothermal brine stream flows in contact with said particulate material to seed the precipitation of dissolved silica from said brine onto said particles so as to reduce the amount of dissolved silica available for precipitation in said reinjection well,
 said vessel means being substantially devoid of atmospheric oxygen and being sealed against entry of atmospheric oxygen therein so as to minimize other chemical reactions in said zone which would be injurious to said reinjection well.

32. The system of claim 31, wherein said zone comprises an enlarged cross section of said flow path which slows down the flow rate of said geothermal brine stream as said stream passes through said zone so as to allow extended time for the silica precipitation reaction to occur.

33. The system of claim 31, wherein said particulate material comprises primarily silica.

34. The system of claim 31, wherein said contact of said brine stream with said particulate material is sufficient to reduce the dissolved siliva content of the brine at least down to approximately the saturated level for the temperature of the brine stream when it reaches the reinjection well.

35. The system of claim 31, wherein said zone of particulate material comprises a floating sludge blanket comprising primarily silica in said vessel means.

36. The system of claim 35, which comprises particle collecting means in said vessel means below said floating sludge blanket for collecting particles of said particulate material which have grown heavy enough to descend below said sludge blanket, whereby said collected particles are prevented from flowing with the brine stream to the reinjection well.

37. The system of claim 36, which comprises outlet conduit means connected to said particle collecting means for removing collected particles from said vessel means.

38. The system of claim 35, wherein the pressure inside said vessel means is at least approximately as high as atmospheric pressure.

39. The system of claim 35, wherein the pressure inside said vessel means is slightly above atmospheric pressure.

40. The system of claim 35, wherein the pressure inside said vessel means is least about 1.0 psig.

41. The system of claim 35, wherein the space above the surface level of the brine in said vessel means is ccupied primarily by steam vapor.

42. The system of claim 41, wherein said geothermal brine stream enters said vessel means at a sufficiently high temperature to produce said steam vapor from the brine, and which comprises thermal insulation means on said vessel maintaining the temperature of the brine in said vessel means sufficiently high to continue the production of steam vapor from the brine.

43. The system of claim 35, wherein said vessel means comprises reactor clarifier means.

44. The system of claim 43, wherein said reactor clarifier means defines a reaction zone in which precipitation of silica in suspended, particulate form is initiated.

45. The system of claim 44, wherein said geothermal brine stream circulates through said reaction zone a plurality of times.

46. The system of claim 44, wherein said geothermal brine stream circulates through said reaction zone at least about 10 times.

47. The system of claim 43, which comprises particle collecting means in said reactor clarifier means below said floating sludge blanket for collecting particles of said particulate material which have grown heavy enough to descend below said silica sludge blanket, and
    outlet means connected to said reactor clarifier means in communication with said particle collecting means for removing collected particles from said reactor clarifier means.

48. The system of claim 43, wherein said geothermal brine stream has a residency time in said reactor clarifier means of at least about 8 minutes.

49. The system of claim 35, wherein said vessel means comprises "Baker" settling tank means.

50. The system of claim 49, which comprises particle collecting means in said "Baker" settling tank means proximate its bottom for collecting particles of said particulate material which have grown heavy enough to descend below said floating silica sludge blanket, and
    outlet means connected to said "Baker" settling tank means in communication with said particle collecting means for removing collected particles from said "Baker" settling tank means.

51. The system of claim 49, wherein said geothermal brine stream has a residency time in said "Baker" settling means of at least about 15 minutes.

52. The system of claim 31, wherein said zone of particulate material comprises a stationary particle bed means in said vessel means.

53. The system of claim 52, which comprises perforated barrier means in said vessel means extending across the brine stream downstream of said stationary particle bed means.

54. The system of claim 52, which comprises means connected to said vessel means for reversing the flow of brine through said stationary particle bed means so as to enable backflushing of said stationary particle bed means with brine derived from said stream downstream of said particle bed means, so as to clean said particle bed means.

55. The system of claim 52, wherein said geothermal brine has a residency time in said stationary particle bed means at least about 8 minutes.

56. In a geothermal energy system which has a geothermal brine flow path comprising a production well providing a stream of high temperature, high dissolved silica content geothermal brine, heat extraction means and a reinjection well, a system for extending the operational life of the reinjection well which comprises:
    vessel means operatively connected in said brine flow path between said heat extraction means and said reinjection well,
    a zone of particulate material in said vessel means through which said geothermal brine stream flows in contact with said particulate material to seed the precipitation of dissolved silica from said brine onto said particles so as to reduce the amount of dissolved silica available for precipitation in said reinjection well, said zone comprising a floating sludge blanket comprising primarily silica,
    said vessel means being substantially devoid of atmospheric oxygen and being sealed against entry of atmospheric oxygen therein so as to minimize other chemical reactions in said zone which would be injurious to said reinjection well, the pressure inside said vessel means being at least approximately as high as atmospheric pressure, and
    one-way vent means from the inside of said vessel means above the surface level of the brine to atmosphere.

57. In a geothermal energy system which has a geothermal brine flow path comprising a production well providing a stream of high temperature, high dissolved silica content geothermal brine, heat extraction means and a reinjection well, a system for extending the operational life of the reinjection well which comprises:
    vessel means operatively connected in said brine flow path between said heat extraction means and said reinjection well, and
    a zone of particulate material in said vessel means through which said geothermal brine stream flows in contact with said particulate material to seed the precipitation of dissolved silica from said brine onto said particles so as to reduce the amount of dissolved silica available for precipitation in said reinjection well, said zone comprising a floating sludge blanket comprising primarily silica,
    said vessel means being substantially devoid of atmospheric oxygen and being sealed against entry of atmospheric oxygen therein so as to minimize other chemical reactions in said zone which would be injurious to said reinjection well, the space above the surface level of the brine in said vessel means being occupied primrily by substantially non-reactive gas other than steam.

58. The system of claim 57, which comprises non-condensable gas separator means in said brine flow path between said production well and said heat extraction means for separating non-condensable gas consisting primarily of carbon dioxide from said geothermal brine stream, and
    conduit means from said non-condensable gas separator means to said vessel means for conducting said non-condensable gas to said vessel means for said non-condensable gas to serve as said substantially non-reactive gas in said vessel means.

59. The system of claim 57, which comprises a source of supply of nitrogen, and
    conduit means from said nitrogen source to said vessel means for conducting said nitrogen to said vessel means for said nitrogen to serve as said substantially non-reactive gas in said vessel means.

* * * * *

REEXAMINATION CERTIFICATE (366th)
United States Patent [19]
McCabe et al.

[11] B1 4,428,200
[45] Certificate Issued Jul. 9, 1985

[54] GEOTHERMAL PLANT FLUID REINJECTION SYSTEM

[75] Inventors: Barkman C. McCabe, Los Angeles; Edward Zajac, Hollywood; John L. Featherstone, El Centro, all of Calif.

[73] Assignee: Magma Power Company, Los Angeles, Calif.

Reexamination Request:
No. 90/000,573, Jun. 6, 1984

Reexamination Certificate for:
Patent No.: 4,428,200
Issued: Jan. 31, 1984
Appl. No.: 177,633
Filed: Aug. 13, 1980

[51] Int. Cl.³ .............................................. F03G 7/04
[52] U.S. Cl. ................................... 60/641.5; 165/45; 210/170
[58] Field of Search ............... 60/641.2, 641.3, 641.4, 60/641.5; 165/45; 210/170, 714, 715, 747

[56] References Cited
U.S. PATENT DOCUMENTS

| | | | |
|---|---|---|---|
| 3,862,545 | 1/1975 | Ellis et al. | 60/641.5 |
| 3,951,794 | 4/1976 | Swearingen | 60/641.2 X |
| 4,089,175 | 5/1978 | Woinsky | 60/641.3 |
| 4,304,666 | 12/1981 | Van Note | 210/197 |

*Primary Examiner*—Stephen F. Husar

[57] ABSTRACT

A system for extending the operational life of the reinjection system of a geothermal power plant energized by high temperature, high silica content geothermal brine from a source such as the Salton Sea geothermal field or the Brawley geothermal field. The stream of geothermal brine which flows through the plant is passed slowly through a zone of particulate material having a large cumulative surface area in contact with the brine to seed the precipitation of dissolved silica from the brine onto the particles so as to reduce the amount of dissolved silica available for precipitation in the reinjection system. The zone of particulate material may be established as a floating silica sludge blanket in a reactor clarifier which also has a reaction zone in which silica precipitation is initiated. The vessel such as a reactor clarifier in which the zone of particulate material is established is maintained devoid of atmospheric oxygen to minimize other chemical reactions in said zone that would be injurious to the reinjection system.

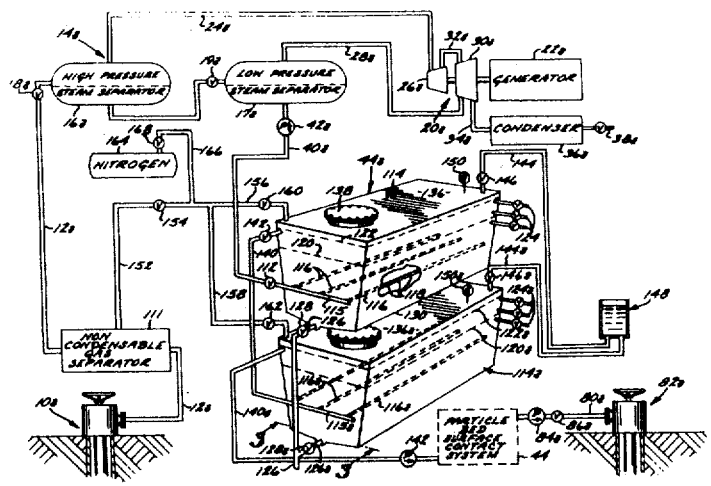

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–19, 23–48 and 52–57 are cancelled.

Claims 20, 49, 58, and 59 are determined to be patentable as amended.

Claims 21, 22, 50, and 51, dependent on an amended claim, are determined to be patentable.

20. The method of [claim 5, wherein said zone of particulate material is established in "Baker" settling tank means] *extending the operational life of a reinjection well in a geothermal energy system which has a geothermal brine flow path comprising a production well providing a stream of high temperature, high dissolved silica content geothermal brine, heat extraction means and a reinjection well, which comprises:*
   *establishing a zone of particulate material in said flow path between said heat extraction means and said reinjection well, said zone of particulate material comprising a floating sludge blanket comprising primarily silica in said geothermal brine stream, and said zone of particulate material being established in "Baker" settling tank means,*
   passing said geothermal brine stream through said zone in contact with said particulate material to seed the precipitation of dissolved silica from said brine onto said particles so as to reduce the amount of dissolved silica available for precipitation in said reinjection well, and
   *minimizing the occurrence of other chemical reactions in said zone which would be injurious to said reinjection well by excluding atmospheric oxygen from said zone.*

49. [The system of claim 35, wherein said vessel means comprises "Baker" settling tank means] *In a geothermal energy system which has a geothermal brine flow path comprising a production well providing a stream of high temperature, high dissolved silica content geothermal brine, heat extraction means and a reinjection well, a system for extending the operational life of the reinjection well which comprises:*
   *vessel means comprising "Baker" settling tank means operatively connected in said brine flow path between said heat extraction means and said reinjection well,*
   *and*
   *a zone of particulate material in said vessel means through which said geothermal brine stream flows in contact with said particulate material to seed the precipitation of dissolved silica from said brine onto said particles so as to reduce the amount of dissolved silica available for precipitation in said reinjection well, said zone of particulate material comprising a floating sludge blanket comprising primarily silica in said vessel means,*
   *said vessel means being substantially devoid of atmospheric oxygen and being sealed against entry of atmospheric oxygen therein so as to minimize other chemical reactions in said zone which would be injurious to said reinjection well.*

58. [The system of claim 57, which comprises] *In a geothermal energy system which has a geothermal brine flow path comprising a production well providing a stream of high temperature, high dissolved silica content geothermal brine, heat extraction means and a reinjection well, a system for extending the operational life of the reinjection well which comprises:*
   *vessel means operatively connected in said brine flow path between said heat extraction means and said reinjection well,* [and]
   a zone of particulate material in said vessel means through which said geothermal brine stream flows in contact with said particulate material to seed the precipitation of dissolved silica from said brine onto said particles so as to reduce the amount of dissolved silica available for precipitation in said reinjection well, said zone comprising a floating sludge blanket comprising primarily silica,
   said vessel means being substantially devoid of atmospheric oxygen and being sealed against entry of atmospheric oxygen therein so as to minimize other chemical reactions in said zone which would be injurious to said reinjection well, the space above the surface level of the brine in said vessel means being occupied primarily by substantially non-reactive gas other than steam,
   non-condensable gas separator means in said brine flow path between said production well and said heat extraction means for separating non-condensable gas consisting primarily of carbon dioxide from said geothermal brine stream, and
   conduit means from said non-condensable gas separator means to said vessel means for conducting said non-condensable gas to said vessel means for said non-condensable gas to serve as said substantially non-reactive gas in said vessel means.

59. The system of claim [57] *58*, which comprises a source of supply of nitrogen, and
   conduit means from said nitrogen source to said vessel means for conducting said nitrogen to said vessel means for said nitrogen to serve as said substantially non-reactive gas in said vessel means.

* * * * *